Sept. 19, 1939.　　　J. W. CAMPBELL　　　2,173,096
EXTENSIBLE CORD
Filed Dec. 18, 1937　　　2 Sheets-Sheet 1
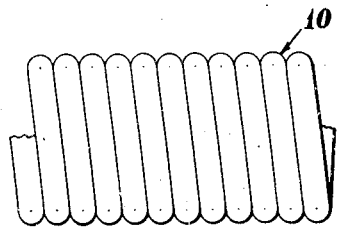
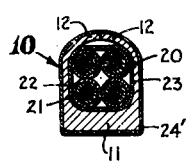
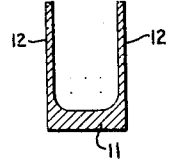
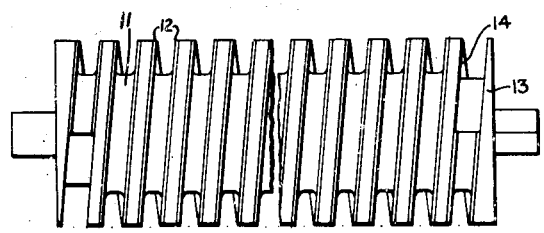
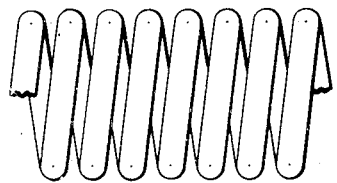
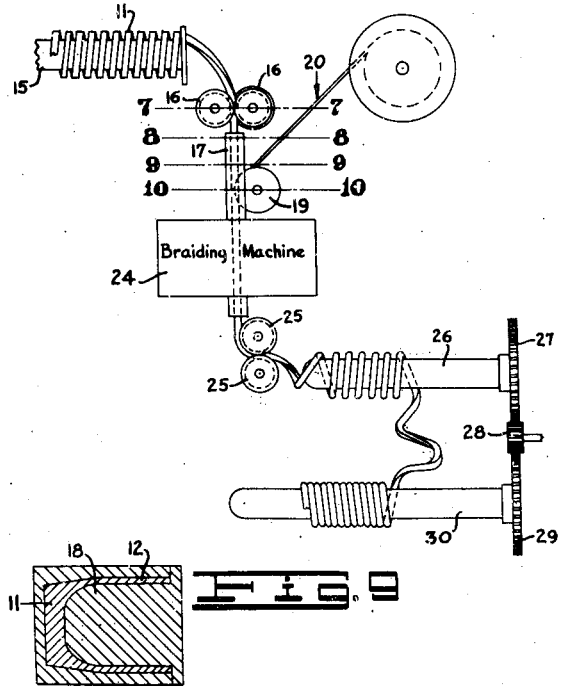
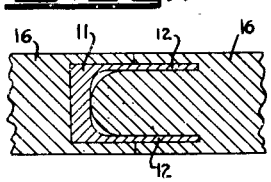
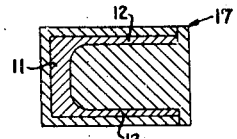
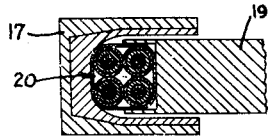
INVENTOR.
John W. Campbell.
BY
ATTORNEY.

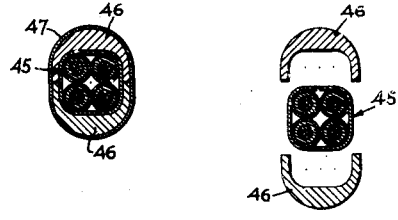
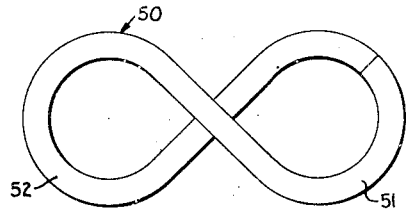
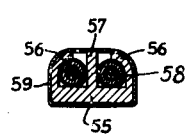
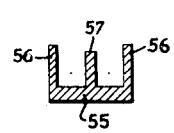
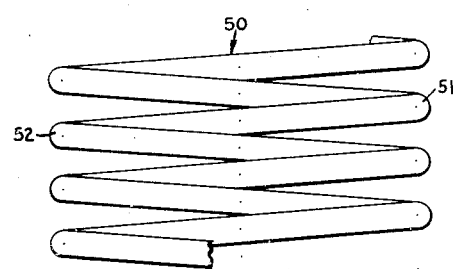
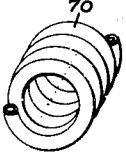
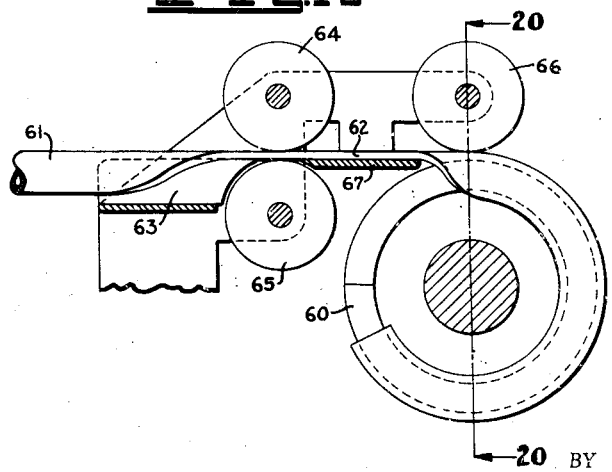
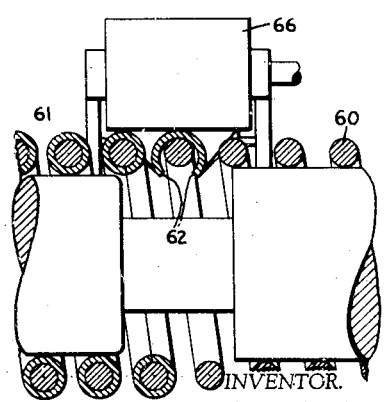

Patented Sept. 19, 1939

2,173,096

UNITED STATES PATENT OFFICE 2,173,096

EXTENSIBLE CORD

John W. Campbell, Banning, Calif., assignor of one-half to Ralph D. Collins, Beverly Hills, Calif.

Application December 18, 1937, Serial No. 180,635

11 Claims. (Cl. 174—69)

This invention relates to extension cords.

The general object of the invention is to provide an extension cord for a fluid conductor such as an electrical cable which is formed in spiral shape and wherein the construction includes a coil the portions of which are in tight engagement.

Another object of the invention is to provide a coiled member for use as an extension cord wherein the elements of the coil member are reversed after forming into a coil so that the tension of the parts holds them in compacted position.

Another object of the invention is to provide a novel arrangement of conducting member and covering therefor wherein the parts are arranged for extension when pulled.

Another object of the invention is to provide a novel method of making an extension cord.

A further object of the invention is to provide a novel apparatus for making an extension cord.

Other objects and the advantages of my invention will be apparent from the following description taken in connection with the accompanying drawings, wherein:

Fig. 1 is a side elevation of a completed extension member embodying the features of my invention;

Fig. 2 is a cross section through the completed member;

Fig. 3 is a sectional view showing the shape of the member into which the raw stock is formed;

Fig. 4 is a side elevation showing the mandrel with the formed coil secured thereon;

Fig. 5 is a diagrammatic view showing the apparatus for forming the extensible cord;

Fig. 6 is a side elevation showing the extensible member after it is completely formed but prior to its reversal;

Figs. 7, 8, 9 and 10 are sectional views taken on lines 7—7, 8—8, 9—9 and 10—10 respectively of Fig. 5;

Fig. 11 is a sectional view through an extensible member showing a modification of my invention;

Fig. 12 is a view similar to Fig. 11 showing the manner in which the parts are assembled;

Fig. 13 is a top plan view of the modification;

Fig. 14 is a side view of the modification;

Figs. 15, 16, 17 and 18 are central sectional views showing modified forms of extensible members;

Fig. 19 is a side elevation, partly in section, showing another type of apparatus;

Fig. 20 is a section taken on line 20—20 Fig. 19;

Fig. 21 is a fragmentary perspective view showing an extensible tube made according to my invention; and Fig. 22 is a view similar to Fig. 1 showing a solid member made according to my invention.

Referring to the drawings by reference characters I have shown my invention as embodied in an extensible cord member which is indicated generally at 10. As shown the cord is intended primarily for conducting fluid for electrical current although it is well adapted for other purposes.

The extensible member includes a body 11 preferably made of rubber and having spaced sides 12. The body 11 is formed of raw stock as by extrusion and is disposed upon a mandrel indicated at 13 which is provided with a helical groove 14 which receives the body 11 as shown in Fig. 4.

The body 11 is vulcanized on its mandrel in any desired manner and is then finished as by apparatus shown in Fig. 5. In this apparatus the body 11, previously vulcanized, is fed from a supply spool 15 and is advanced between rolls 16 whence it passes through a guide member 17. The guide member includes an expansion portion 18 which expands the side walls as shown in Fig. 9 so that a supply wheel 19 may feed a cable member, indicated generally at 20, between the sides of the body 11.

The cable 20 as shown in Figs. 2 and 10 may include a plurality of conductors 21 having insulation 22 thereabout and all arranged within an insulating covering 23. This conductor may be in the nature of a telephone cord or may have other uses as will be apparent to those skilled in the art.

After the extensible member receives the electrical cable 20 it passes to a braiding machine indicated in diagram at 24 which places a braided covering 24' over the entire cord, thence to feed rollers 25 which cause the extensible member to be fed upon a spool 26. This spool 26 drives gears 27, 28 and 29 and a spool 30 which thus rotates in the same direction as that of the shaft 26.

The extensible member is given a twist between the spools 26 and 30 and is thus wound on the shaft 30 with its pitch reversed to that in which it is unwound from the shaft 26. This reversal of pitch changes the compression on the extensible member rubber portions and causes the coils to become tightly compacted as shown on the spool 30 and in Fig. 1 of the drawings.

In Figs. 11 and 12 I show a modification of my invention wherein the cable 45 is provided with a pair of resilient covering members 46 which together form a complete body. These members are formed in a coiled manner similar to that described in the body 11 and are completed by bringing the two members 46 together and arranging a braided covering 47 thereover.

In Figs. 13 and 14 I show a modification of my invention wherein an extensible member 50 consists of a pair of coils 51 and 52. These coils are manufactured similar to the manner described and after being constructed have their coils reversed to provide the compressible action mentioned.

In Figs. 15 and 16 I show a modification wherein the body 55 is provided with sides 56 and with a partition 57. This body is vulcanized in helical form and after which the pitch is reversed. In completing the body conductors 58 are placed therein and a cover 59 is braided thereabout.

In Figs. 17 to 20 inclusive I show a modification of my invention wherein a spring member 60 is made according to the invention previously described and the coils are reversed to resist separation thereof. These coils are preferably made of fairly heavy wire and are provided with a covering 61 which is in the nature of a hollow rubber tube made of semi-vulcanized rubber with a slit 62 therein. The tube 61 is fed over a plow member 63 to open the same whence it passes between rolls 64 and 65 and to a feed roll 66. A guide member 67 feeds the open tube over the coils of the spring 60 as the latter is advanced so that the coils 60 are covered. The slit 62 is then vulcanized in closed position in any desired manner so that the coils 60 are thus resiliently protected.

In Figs. 21 and 22 I show a tube member 70 and a solid resilient member 71 respectively which comprise further modifications of my invention. These members 70 and 71 are made of rubber or similar material on a mandrel or otherwise and have their pitch reversed after they are vulcanized as will be understood from the foregoing description.

From the foregoing description it will be apparent that I have invented a novel extensible member, the method of making the same, and also an improved apparatus for making the same and that my invention is one that can be practiced economically.

Having thus described my invention I claim:

1. In an extension device, a resilient member comprising a helically formed body having the pitch of the coils thereof reversed after forming.

2. In an extension device, a conductor, a resilient member about said conductor, said member comprising a helically formed body having the pitch of the coils thereof reversed after forming.

3. In an extension device, a continuous resilient helical body arranged in two coils disposed side by side with the pitch of the coils reversed after forming.

4. In an extension device, a hollow resilient body formed of two parts, said body parts being helically formed and having the pitch thereof reversed after forming, a conductor in said member and fabric covering about said parts.

5. In an extension device, a hollow resilient body helically formed and having the pitch thereof reversed after forming, said body having a partition forming pockets, a conductor in each pocket and a covering about said body.

6. In an extension device, a resilient hollow tubular rubber member comprising a helically formed body having the pitch of the coils reversed after forming.

7. In an extension device, a resilient hollow tubular rubber member comprising a helically formed body having the pitch of the coils reversed after forming and a resilient elongated member in said body.

8. The method of making an extension member comprising forming an elongated resilient body in helical form and thereafter reversing the pitch of the loops constituting the helix.

9. The method of making an extension conductor comprising making an elongated resilient body in helical form and thereafter reversing the pitch of the loops to bring the loops into direct engagement.

10. The method of making extension members comprising vulcanizing an elongated resilient rubber body in helical form upon a mandrel and thereafter reversing the pitch of the loops to bring the loops into direct engagement.

11. The method of making extension members comprising vulcanizing an elongated resilient body in helical form upon a mandrel, arranging a conductor member in said body, braiding a cover over the body and conductor member and thereafter reversing the pitch of the loops.

JOHN W. CAMPBELL.